United States Patent [19]

Kleinwaks et al.

[11] Patent Number: 5,403,192
[45] Date of Patent: Apr. 4, 1995

[54] SIMULATED HUMAN LUNG FOR ANESTHESIOLOGY SIMULATION

[75] Inventors: Jeffrey M. Kleinwaks, Vestal; Mansour Koosha, Endwell; William K. Prendergast, Kirkwood; David L. Larrabee, Vestal, all of N.Y.

[73] Assignee: CAE-Link Corporation, Binghamton, N.Y.

[21] Appl. No.: 60,022

[22] Filed: May 10, 1993

[51] Int. Cl.⁶ .............................................. G09B 23/28
[52] U.S. Cl. .................................................. 434/272
[58] Field of Search ................. 434/262, 265, 267, 272

[56] References Cited

U.S. PATENT DOCUMENTS

| | | | |
|---|---|---|---|
| 3,520,071 | 8/1970 | Abrahamson et al. | 434/265 |
| 3,808,706 | 5/1974 | Mosley et al. | 434/272 X |
| 4,167,070 | 9/1979 | Orden | 434/272 |
| 4,917,080 | 4/1990 | Bayerlein | 128/204.23 |
| 4,932,879 | 6/1990 | Ingenito et al. | 434/262 |
| 4,996,980 | 3/1991 | Frankenberger et al. | 128/200.24 |

Primary Examiner—Gene Mancene
Assistant Examiner—Jeffrey A. Smith
Attorney, Agent, or Firm—Malin, Haley, DiMaggio & Crosby

[57] ABSTRACT

A compact system that simulates a pair of human lungs. The lungs can be controlled to breathe spontaneously under a computer program, or the lungs can also be ventilated from a standard mechanical ventilator used in anesthesiology. Lung compliance and resistance can be varied during a simulation exercise to simulate various physiological disease conditions. The unit is compact and will fit into the chest cavity of a mannequin. The device is especially useful for the training of anesthesiologists, especially with respect to ventilating patients.

3 Claims, 4 Drawing Sheets

SIMULATED HUMAN LUNG FOR ANESTHESIOLOGY SIMULATION

BACKGROUND OF THE INVENTION

1. Field of the Invention

This invention relates to the field of anesthesiology simulation to provide a mannequin for use in training anesthesiologists, and in particular, to a simulated human lung that can be utilized in the mannequin for the training of anesthesiologists.

2. Description of the Prior Art

The human lung is an organ that is activated by contractions of the diaphragm muscle to provide an intake of oxygen $O_2$ from the atmosphere for transfer to the person's blood and to expel $CO_2$ which is received from the blood for exhalation back into the atmosphere. When a patient is anesthetized for medical treatment, such as surgery, a muscle relaxant drug is administered by a qualified anesthesiologist to prevent all body muscular contraction to inhibit patient movement during the medical treatment. The muscle relaxing drug affects all the muscles in the body, including the diaphragm, requiring that the patient be artificially ventilated while anesthetized to provide proper oxygen $O_2$ intake and $CO_2$ output. Since the patient cannot breathe normally or voluntarily while under a muscle relaxant drug, the patient's entire breathing is completely dependent on the ventilating equipment. Thus, one of the most important functions that an anesthesiologist must perform is the proper ventilation of a patient while anesthetized. The insertion and proper placement of respiratory tubes in the trachea requires the skilled anesthesiologist. Misalignment or misplacement of the $O_2$ intake tube can divert $O_2$ into the stomach instead of the lungs, resulting in severe patient injury or death. Equipment failure of the ventilating equipment can also result in patient injury and is something that must be constantly monitored by the anesthesiologist during the ventilation process. Failure of the proper amount of $O_2$ to flow can also result in an injury or death to the patient.

Heretofore, almost all training of anesthesiologists has been by having the student doctor observe numerous actual patients being anesthetized by one or more skilled anesthesiologists. The anesthesiologist must remain present during the patient treatment or operation for the entire period that the patient is being ventilated. Thus, in the training cycle, typically, the students will also be required to spend several hours as an observer. Such a training procedure is extremely costly and provides little guarantee that the student will be able to observe all possible emergency problems that can arise during the time period that the patient is anesthetized. Obviously, during an actual patient operation, there is no opportunity to practice typical or even unexpected emergencies that could happen during the actual process.

The present invention is utilized within an anesthesiology simulator and is one of the very critical elements with regard to the anesthesiology process with respect to ventilation to provide effective simulation of a patient being anesthetized, especially with respect to the patient respiratory system. The present invention provides for a simulated human lung that can simulate spontaneous breathing of the human lungs and can simulate the ventilated breathing of a human lung with the entire system fitting comfortably within a mannequin that is used as part of the overall simulation. Further, the present invention can provide extreme accuracy in simulating dynamic lung compliance and resistance variations, oxygen content sensing of the inspired air, and injection of carbon dioxide into the lungs to simulate the human body's physiological production of carbon dioxide.

The use of simulation for anesthesiology has been done at some universities in the United States, such as the University of Florida at Gainesville, Fla., and at Stanford University in Palo Alto, Calif. The University of Florida at Gainesville has employed a mechanical lung as part of their anesthesiology simulator. Although the system works well, it is large and is not maintained within the mannequin chest cavity. Dynamic lung compliance and resistance changes are done mechanically and often, the simulation exercise is stopped in order to change parameters.

U.S. Pat. No. 3,520,071, issued to S. Abrahamson et al. Jul. 14, 1970, shows an anesthesiological training simulator. Although the device shown in this patent includes chest movement, complex lung simulation is not achieved. U.S. Pat. No. 4,917,080, issued to Bayerlen Apr. 17, 1990, describes a method for controlling a ventilating apparatus using a simulator arrangement. This method uses an adjustment selected according to patient data which is changed for optimization after a workin time period. U.S. Pat. No. 4,797,104, issued to Laerdal et al. Jan. 10, 1989, describes a system for testing performance of cardio-pulmonary resuscitation, which includes the use of a mannequin. U.S. Pat. No. 4,878,388, issued to Loughlin et al. Nov. 7, 1989, describes a method for simulating gas exchange during ventilation that permits simulation of physiological functions occurring during anesthesia, such as the uptake and release of anesthetic agents.

SUMMARY OF THE INVENTION

An apparatus for simulating a human lung for use in a mannequin for anesthesiology training and simulation, comprising a bellows having an inlet and an outlet and a movable diaphragm for providing an outlet stream of air under pressure, a servomotor for mechanically actuating said bellows, a source of oxygen fluidly connected to said bellows, a source of carbon dioxide fluidly connected to said bellows, a circuit means for controlling said servomotor and said oxygen supply and said carbon dioxide supply into said bellows, and a control means for receiving input data for simulating conditions of the human lung connected to said circuit means, whereby the intake and the output of the bellows is controlled to simulate the dynamic compliance and resistance of a human lung during spontaneous or ventilated respiration.

The bellows is a deformable chamber for producing a strong current of air having a flexible wall, an air chamber, and a valve, the flexible wall being contracted and expanded by mechanical action against the wall, allowing the air to be released through an outlet nozzle.

The bellows also has connected thereto an oxygen sensor showing lung oxygen content that is simulated and a mass flow control valve for a $CO_2$ supply for the lung $CO_2$ command.

The bellows is sized to fit within a human-sized mannequin chest cavity and as discussed, is for one lung only. Both lung systems in the mannequin for anesthesiology simulation will be the same.

The lung bellows includes a flexible, airtight member that is moved by a rigid plate connected to a servomotor and mechanical linkage, with the bellows including a manifold for directing a flow of air that represents breathing of the simulated patient. The flow of air is connected to a ventilator, representing the output of the mannequin being simulated.

The device uses a personal computer that has a ventilation model software program, wherein the computer is connected to circuitry that provides signals to the system to represent various parameters achievable for both normal and emergency operations surrounding the mannequin lung output.

The device is operated in either a spontaneous lung mode which represents a person breathing, or a ventilated mode which indicates that the patient has been anesthetized and has received a muscle relaxant so that the patient is now breathing with the aid of a ventilator machine.

The system includes a breath profile generator that relates to the spontaneous breath rate and the spontaneous breath profile information which comes from the computer program that generates a signal for the demanded position for proper positioning and operation of the lungs through the servomotor.

The system also includes a breath measurement for measuring the rate and volume of the breath that goes to the computer. An oxygen sensor is provided in the lung bellows and the output of the oxygen sensor provides data to the computer program. The lung bellows also includes a $CO_2$ supply that goes through a mass flow control valve to the lung bellows to provide $CO_2$ into the lung bellows. The mass flow control valve is controlled by an input signal from a lung $CO_2$ command that is received from the computer.

Circuitry is provided for creating a torque command signal to the servopower amplifier. This would include signals based on the ventilation model for lung compliance and lung resistance. Lung compliance and lung resistance input signals received from the computer are necessary for both the spontaneous and the ventilated modes of operation and are fed to the circuitry that generates signals for the torque command to the servopower amplifier. The servomotor itself includes an output showing the servo position that goes back to a circuit that generates position.

The mechanical bellows represents a single lung. A pair of bellows are used to simulate left and right lungs inside the mannequin. The bellows are physically sized to fit comfortably in a chest cavity and to accommodate two separate bellows for the mannequin. Each bellows is mounted between a base manifold and a metal top plate. The movable metal top plate which drives the bellows is driven by a servomotor system that drives the bellows up and down during the spontaneous breathing mode. The servomotor system provides dynamic lung compliance and resistance effects through servo loop gain modifications during the ventilated breathing mode. Carbon dioxide is injected through a port in the manifold into the bellows through the mass control valve in response to commands from the physiological model that represents the output from the personal computer software program. Oxygen sensors are connected to the manifold in order to sense the oxygen content of the gas inside the bellows.

A spontaneous mode switch is used to select whether lung compliance and lung resistance commands are to be applied to the mechanical lung. When the lung is undergoing external ventilation, which represents that the patient is anesthetized as opposed to spontaneous breathing, lung compliance and resistance commands are applied.

The invention operates in two distinct modes, which are the spontaneous breathing mode and the ventilated mode. In the spontaneous mode, the computer provides signals ultimately to the servomotor through circuitry that allows the bellows to provide an output that simulates human breathing. In the ventilated mode, the situation is simulated, wherein the human being is under a muscle relaxant so that respiration must be accomplished from a ventilator. Using the present invention, an actual ventilator machine may be used and plugged into the mannequin through the simulated trachea, thereby allowing the student doctors to simulate using a ventilator as if it were a real person. The bellows and associated equipment provide lung compliance and lung resistance, along with $CO_2$ variations for simulation using the ventilator. The computer program for use with a personal computer or other conventional CPU will include a ventilator model and sufficient lung modeling to provide necessary signals to control the breath rate and volume or lung compliance and lung resistance, depending on which mode the machine is in. A breath profile generator is utilized in the spontaneous mode that includes a feedback circuit and air positioning signals for use by the servomotor through a servopower amplifier. A sensor may also be utilized for measuring the amount of oxygen in the lung and the amount of $CO_2$ in the lung, wherein the $CO_2$ can be controlled through a mass flow control valve to provide various scenarios that could be useful to the anesthesiologist in ascertaining the status of the patient. For example, the amount of $CO_2$ being exhaled from a patient is constantly monitored to insure that the patient is breathing properly, either under a ventilator or spontaneously. If the ventilator input is not properly positioned in the patient, then improper breathing will result, which may be detected by noting the change in $CO_2$ in the patient's breath.

The present invention is an extremely compact unit that allows a pair of the units to be placed inside a normal sized human mannequin chest cavity. The device includes a small, rigid housing that contains an airproof bellows, an actuating plate that is hinged to allow for movement of the bellows, a manifold connected to the output of the bellows for directing air outwardly or for receiving air inwardly, and a servomotor and linkage connected to the drive plate, which provides for movement of the drive plate, therefore driving the bellows.

The computer program that includes the lung modeling and ventilator modeling will then provide signals to the system which includes a mode switch for determining whether the device is in spontaneous or ventilated mode. Once the mode switch has been selected, then the particular operation of the device will be determined. In the spontaneous mode, the simulated lung will provide for movement of the chest cavity in the mannequin as it would in a normal person. The breathing rate and volume will be determined by the input information received from the computer program. The servomotor will be receiving signals and has a feedback signal that allows it to control the linkage for moving the bellows as appropriate to the breath rate desired.

In the ventilated mode, the ventilator will provide input air and oxygen into the lung through the mannequin's mouth and trachea, which includes inserting a device into the trachea and turning the air on and controlling the air flow into the lungs. Thus, after the ventilator mode is selected, signals are presented to the servomotor and linkage that allows it to provide compliance and resistance as a regular lung would do. The device manifold also includes a carbon dioxide ($CO_2$) inlet conduit from a $CO_2$ supply and a main control valve which allows the $CO_2$ content in the manifold to be varied, depending on the nature of the problem.

It is an object of this invention to provide an improved apparatus that simulates a pair of human lungs.

It is another object of this invention to provide a mechanical lung for use in a patient simulator that is compact in size to fit within the chest cavity of a human-sized mannequin.

And yet another object of this invention is to provide a simulated human lung for use in an anesthesiology simulator that provides both ventilated and spontaneous breathing, dynamic lung compliance and resistance variations, oxygen content sensing of the inspired air, and injection of carbon dioxide into the lungs to simulate the human body's physiological production of carbon dioxide.

In accordance with these and other objects which will be apparent hereinafter, the instant invention will now become described with particular reference to the accompanying drawings.

DESCRIPTION OF THE PREFERRED EMBODIMENT

This invention is a machine that simulates a pair of human lungs. Since each simulated lung functions identically, the description will be with respect to one lung.

Figure 1:
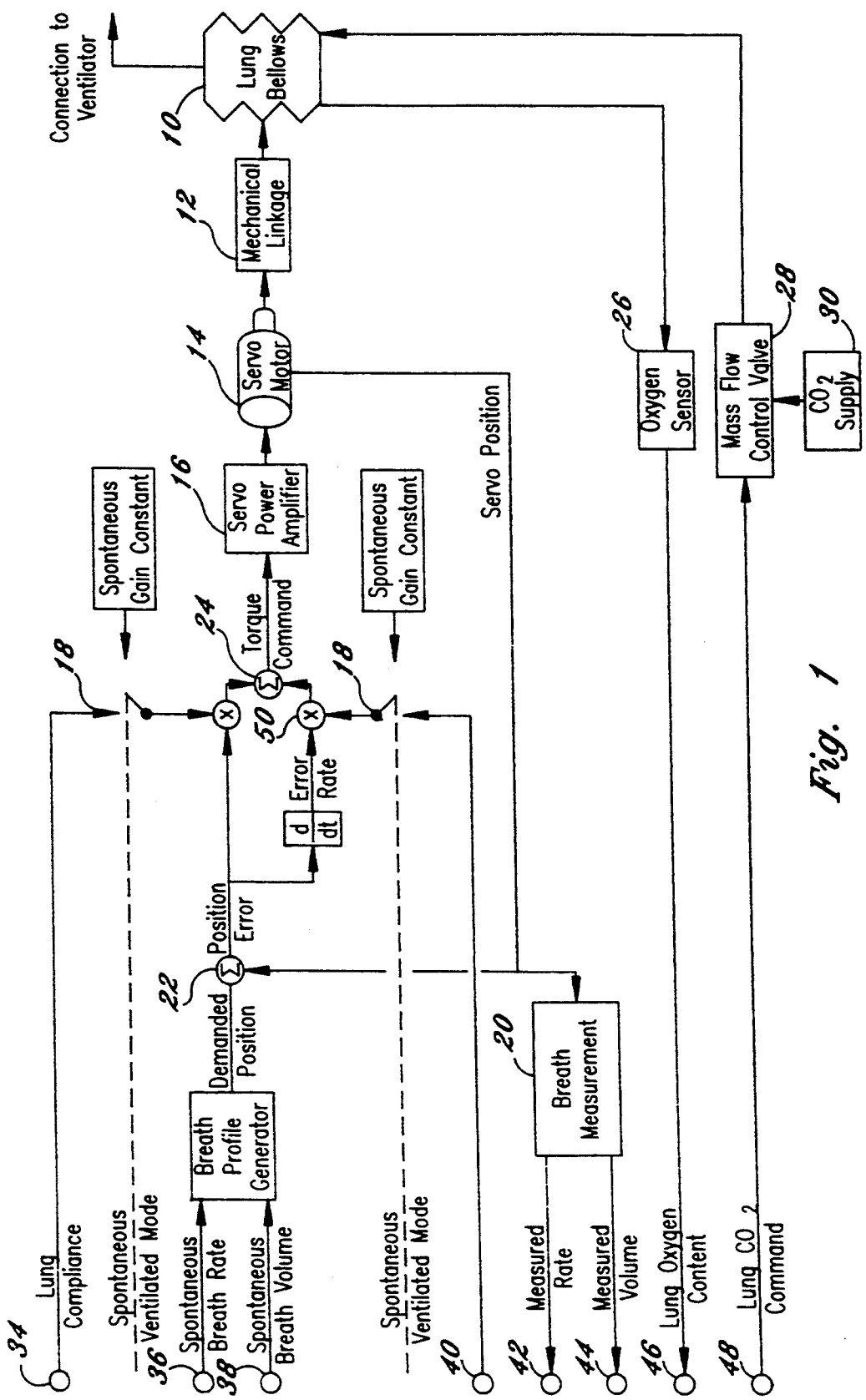
FIG. 1 is a block diagram showing the present invention.

Referring now to FIG. 1, the invention is shown having a bellows 10 that is connected to mechanical linkage 12 that is actuated by a servomotor 14. The servomotor 14 is connected to a rack and pinion that allows for linear movement of the mechanical linkage 12 that drives the bellows from one position to another, which is described below. The servomotor 14 receives its command signals from a servopower amplifier 16 connected to the output of circuit 24 that provides torque commands to the power amplifier.

The system is connected to a CPU, which can be a personal computer or the like, and a computer program that provides various input data from a ventilator model that is part of the computer program and particular information as to rate and volume of the lung, explained in greater detail below.

The mode switch 18 controls one of two modes that is used to operate the device. There is a spontaneous breathing mode which is utilized to actually simulate the breathing of a person prior to their being anesthetized. The second mode of operation is the ventilated mode which simulates and allows the device as shown to be connected to an actual ventilator machine so that the bellows and simulated lung act like a lung that is being ventilated. Therefore, the commands to the servomotor are going to be first a function of which mode is selected, either spontaneous or ventilated mode. The computer program provides a breath profile generator 32 and breath measurement 20. Therefore, the computer provides spontaneous breath rate and spontaneous breath volume information to the breath profile generator program, which comes up with the volume demanded of the lung or position signal information for driving the bellows. The servomotor also gives feedback information to circuit 22 for developing a position error based on demanded volume, useful in the spontaneous breathing mode. This information is provided through to circuit 24, which provides a smooth, but continuous torque command signal to the servopower amplifier.

In the ventilated mode, the CPU provides information for lung compliance 34 and lung resistance 40, which information is then used when the ventilator is being applied to the bellows as a measure of the elasticity of the lung and the resistance in the air passages to simulate various conditions of a human being as if it were a person being actually ventilated. This information is also fed to circuit 24 in the ventilated mode so that the motor itself can provide mechanical action on the bellows that simulates the lung compliance and the lung resistance during ventilation operation. The servomotor also provides information to breath measurements such as the measured rate and measured volume, which are inputs into the computer 42 and 44. Connected to the bellows is an oxygen sensor 26 which also provides information to the computer program as to the lung oxygen content at 46.

Figure 2:
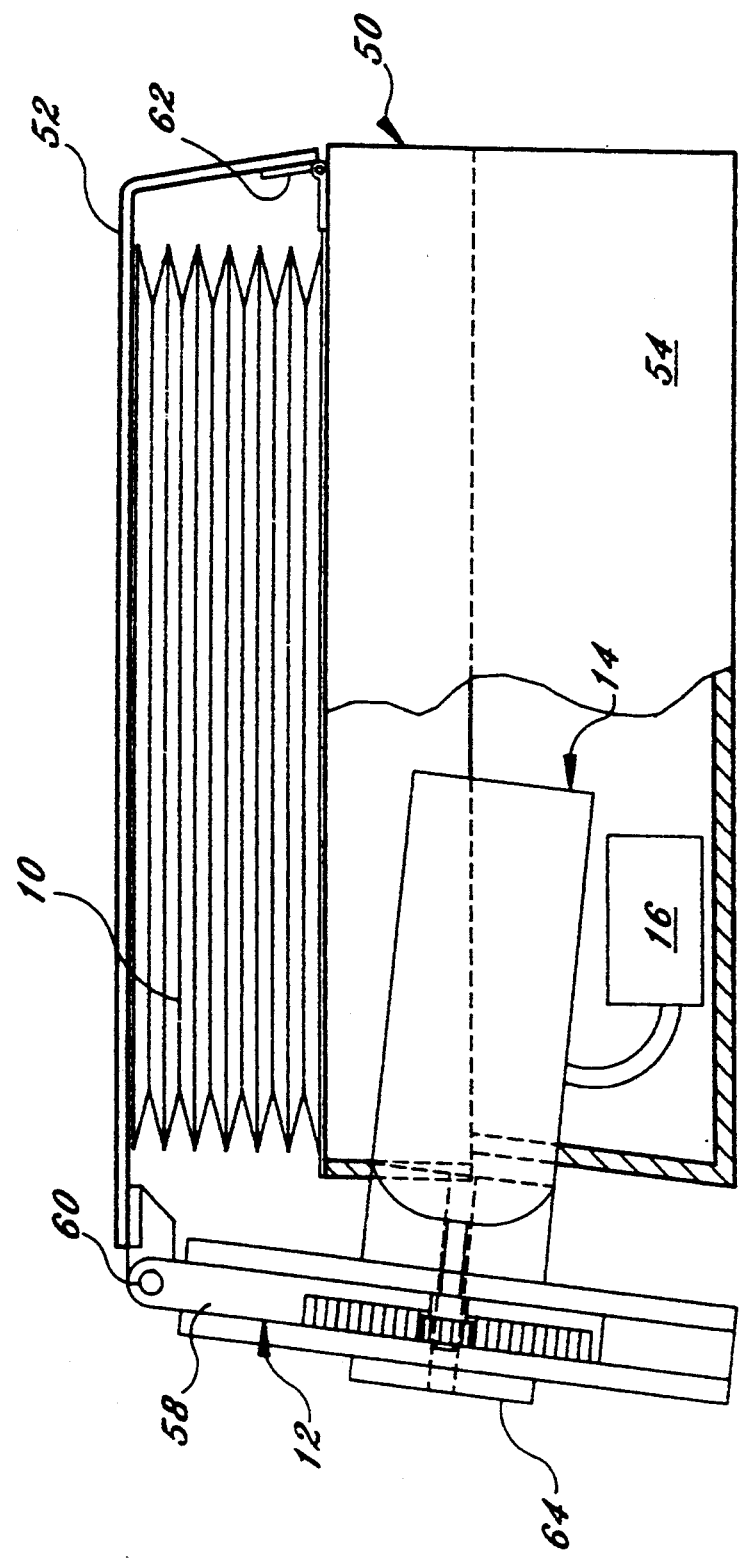
FIG. 2 is a side elevational view, partially in cross section, showing the present invention.
Figure 3:
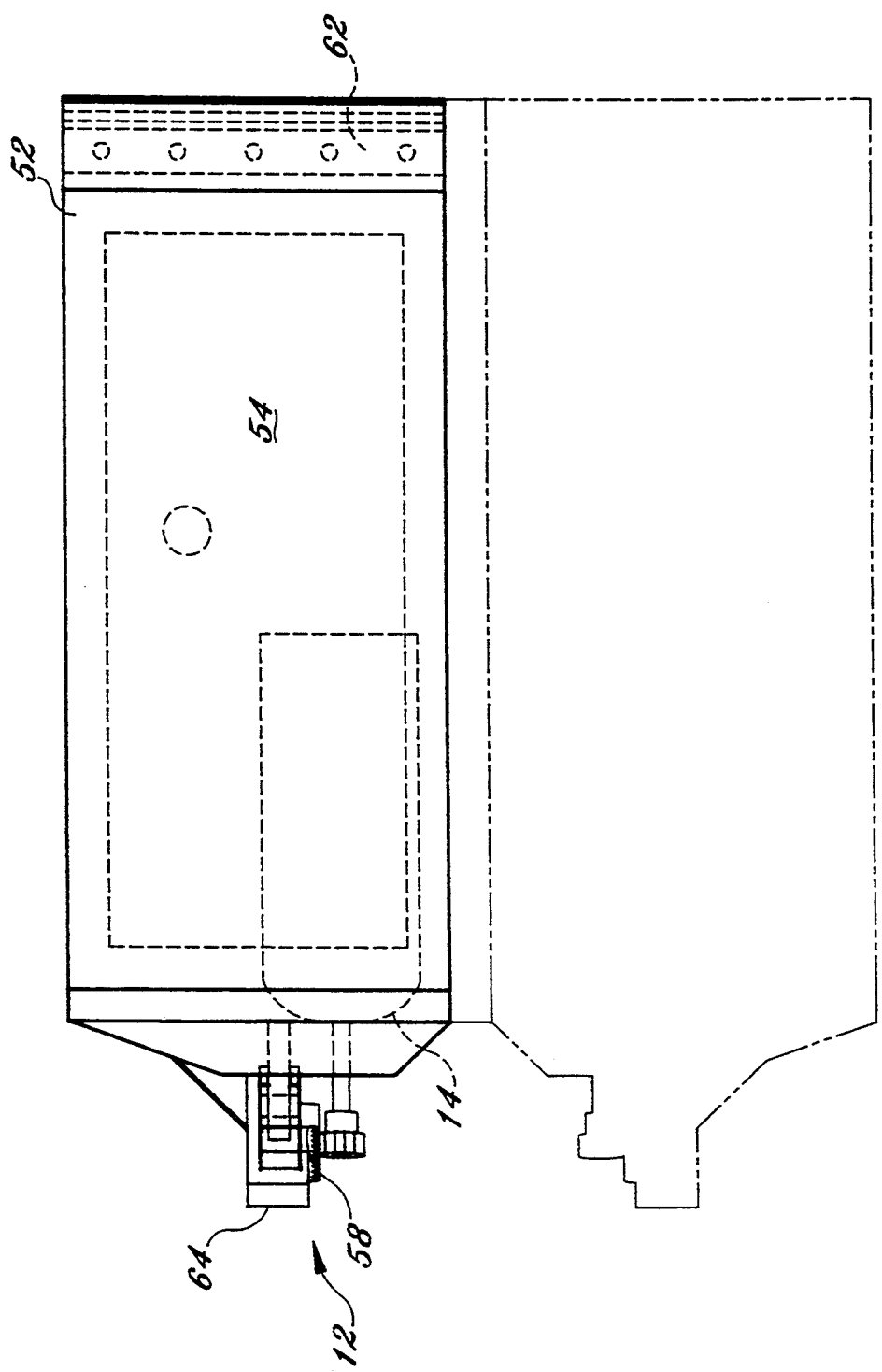
FIG. 3 is a top plan view of the present invention.
Figure 4:
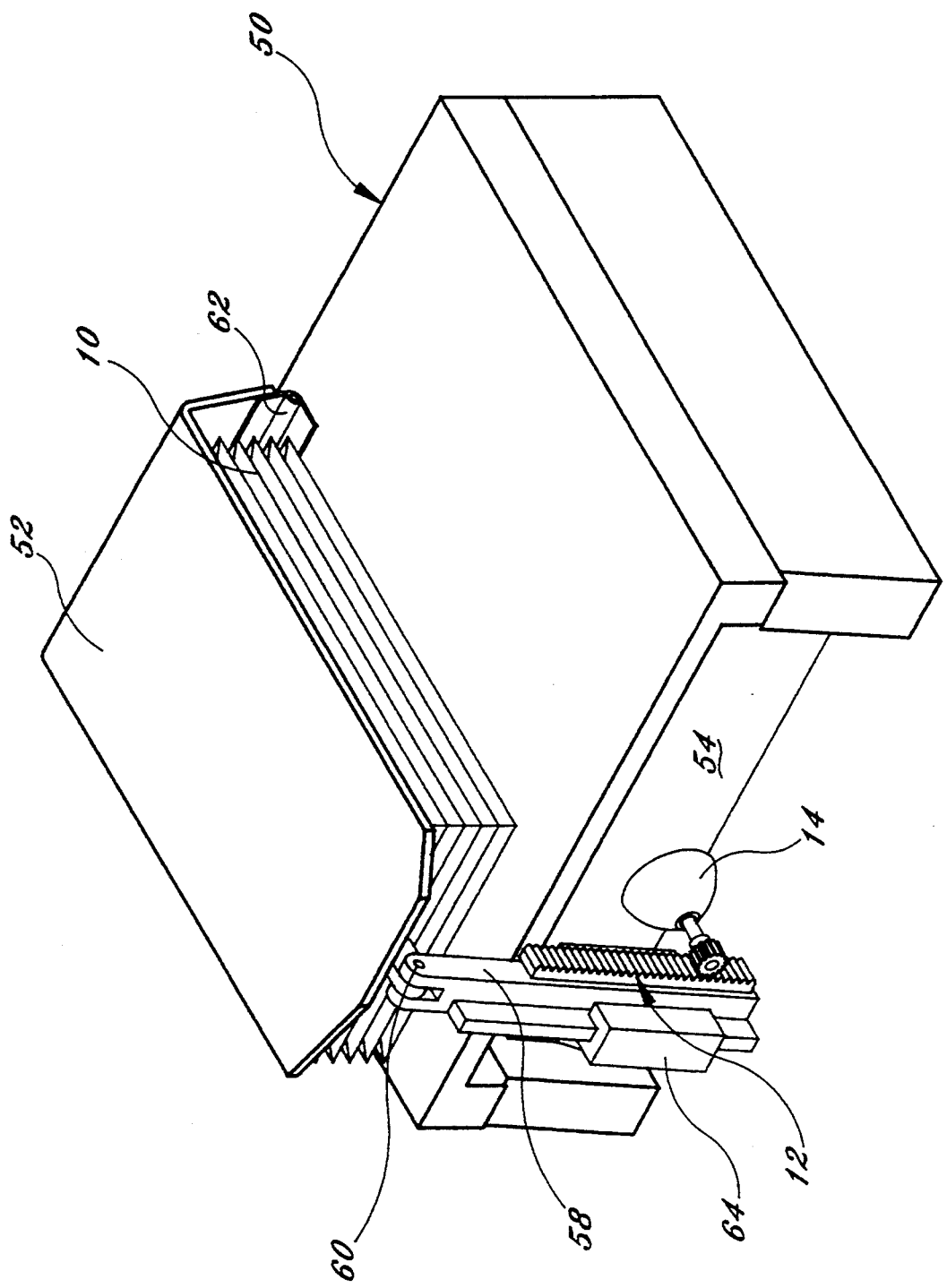
FIG. 4 is an isometric view of the present invention.

The device includes a mass flow control valve that is connected to a $CO_2$ supply 30 with the control valve 28 providing $CO_2$ into the bellows during the simulated training as required to simulate various conditions on the exhalation of the simulated lung. Information from the CPU is received at 48 for lung $CO_2$ command. Referring now to FIGS. 2, 3, and 4, the mechanical construction of one lung is shown that includes a movable rectangular wall 10 which is the bellows that is sealed on the top and connected to a top plate 52, which is hinged and connected to a rectangular housing 50 so that the top plate can pivot around the hinge 62. The bottom of the bellows is connected to a manifold 54 so that as bellows 10 is moved by action on top plate 52, it will have an air flow in either direction as a direct function of the bellows 10. Mechanical linkage 12 is connected by a rack 58 and pinion 64 to motor 14, which is the servomotor, driven by a servopower amplifier represented by block 16 connected to the motor. The servomotor 14 thus drives the linkage 12 moving plate 52 upwardly and downwardly as a direct function of rotation of the motor shaft, which will to create an air pressure and flow in manifold 54 to simulate either spontaneous breathing rate in the spontaneous mode of operation or simulate lung compliance and lung resistance during the ventilator mode. The manifold may be connected to a second similar device that simulates the other lung so that for the simulated training device, the patient can be simulated as having one lung or two lungs or a collapsed lung with the common air manifold output going to the mannequin trachea or other simulated windpipes for the mannequin. Thus, the manifold is large enough to have two bellows connected thereto. The manifold is essentially a $10'' \times 10'' \times 1''$ walled structure with apertures for being in fluid communication with the bellows and the trachea conduits, and is essentially hollow on the inside a rigid, plastic, airtight chamber being formed. Since the bellows 10 is in direct fluid communication with one or more apertures in the manifold, as the bellows is moved by the action of the motor and linkage, air will flow throughout the manifold as a direct function of the movement of the bellows. Because of the compact size, it is clear that the device can fit readily into the chest cavity of a mannequin, providing for two lungs. As shown in FIG. 4, a mount 66 is shown on one side which would allow it to be rested against the inside cavity of the mannequin.

Referring back to FIG. 1, the operation of the device would be first initiated by selecting switch 18 for spontaneous breathing. The computer would provide information to a breath profile generator, which provides signals ultimately to the servomotor, that would activate the motor in a breathing sequence of a normal person or a patient selected with some problems. Thus, the rate of breathing and the volume of breathing can be controlled in a spontaneous mode of operation. As the patient is anesthetized, a point will come when the patient must be transferred to a ventilator in order to breathe. At that point in time, the mode of operation will be switched at switch 18 to the ventilated mode, wherein the ventilator output will be introduced into the trachea of the mannequin, which will provide positive air pressure for breathing into manifold 54 in the lung bellows. At this point, the CPU can provide information for positioning or moving the servomotor that provides for lung compliance simulation and lung resistance simulation through circuit 24. The bellows also includes an oxygen sensor 26 which feeds information back to the CPU as to the overall oxygen content of the lung. Lung $CO_2$ command will provide information to the mass flow control valve that can adjust the $CO_2$ output through valve 28 which receives $CO_2$ from a supply 30 that is directed into the bellows.

Thus, many different types of problems can be presented, both for the student's benefit and training for emergencies on situations that could not be readily actually observed. Equipment failure, such as ventilator failure, sensor failure, and various other types of emergency situations, can be introduced, as well as improper positioning of the ventilator. The invention is shown as extremely compact and fits within the chest cavity and can provide for both spontaneous breathing or a ventilated mode. In addition, other outputs can be used that create sound generation for breathing sounds and chest movement on the mannequin as if one were breathing.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A machine for simulating a human lung for use in a mannequin chest cavity, comprising:
   bellows means;
   servomotor;
   linkage means for connecting said servomotor to said bellows;
   housing means for housing said bellows and said servomotor;
   air manifold connected to said bellows;
   mechanical actuator means connected to said servomotor linkage and said bellows for moving said bellows to a first position and a second position;
   first computer program means for providing a physiological model for simulating a human lung;
   second computer program means for providing a model for a ventilator used to ventilate patients that are anesthetized;
   circuit means connected to each of said computer program means and said servomotor for positioning said servomotor as a function of the computer models; and
   $CO_2$ supply;
   mass flow control valve connected to said $CO_2$ supply and to said bellows; and
   input control signal to said mass flow control valve connected to a computer and said mass flow control valve, whereby the $CO_2$ content of the bellows can be controlled for training purposes.

2. A device as in claim 1, wherein said housing means is sized to fit within a human-sized mannequin chest cavity.

3. A machine for simulating a human lung for use in a mannequin chest cavity, comprising:
   bellows means;
   servomotor;
   linkage means for connecting said servomotor to said bellows;
   housing means for housing said bellows and said servomotor;
   air manifold connected to said bellows;
   mechanical actuator means connected to said servomotor linkage and said bellows for moving said bellows to a first position and a second position;
   first computer program means for providing a physiological model for simulating a human lung;
   second computer program means for providing a model for a ventilator used to ventilate patients that are anesthetized; and
   circuit means connected to each of said computer program means and said servomotor for positioning said servomotor as a function of the computer models; and
   a mode switch circuit connected to said servomotor control circuit, said mode switch having a first mode for simulating spontaneous breathing and a second mode for simulating a ventilated mode, whereby the servomotor will respond as a function of the mode switch.

* * * * *